Sept. 12, 1950     C. F. HARR     2,521,847
APPARATUS AND METHOD FOR HEATING MOLDS
Filed Aug. 30, 1949     2 Sheets-Sheet 1

Inventor
Claude F. Harr
Nobbe & Swope
Attorneys

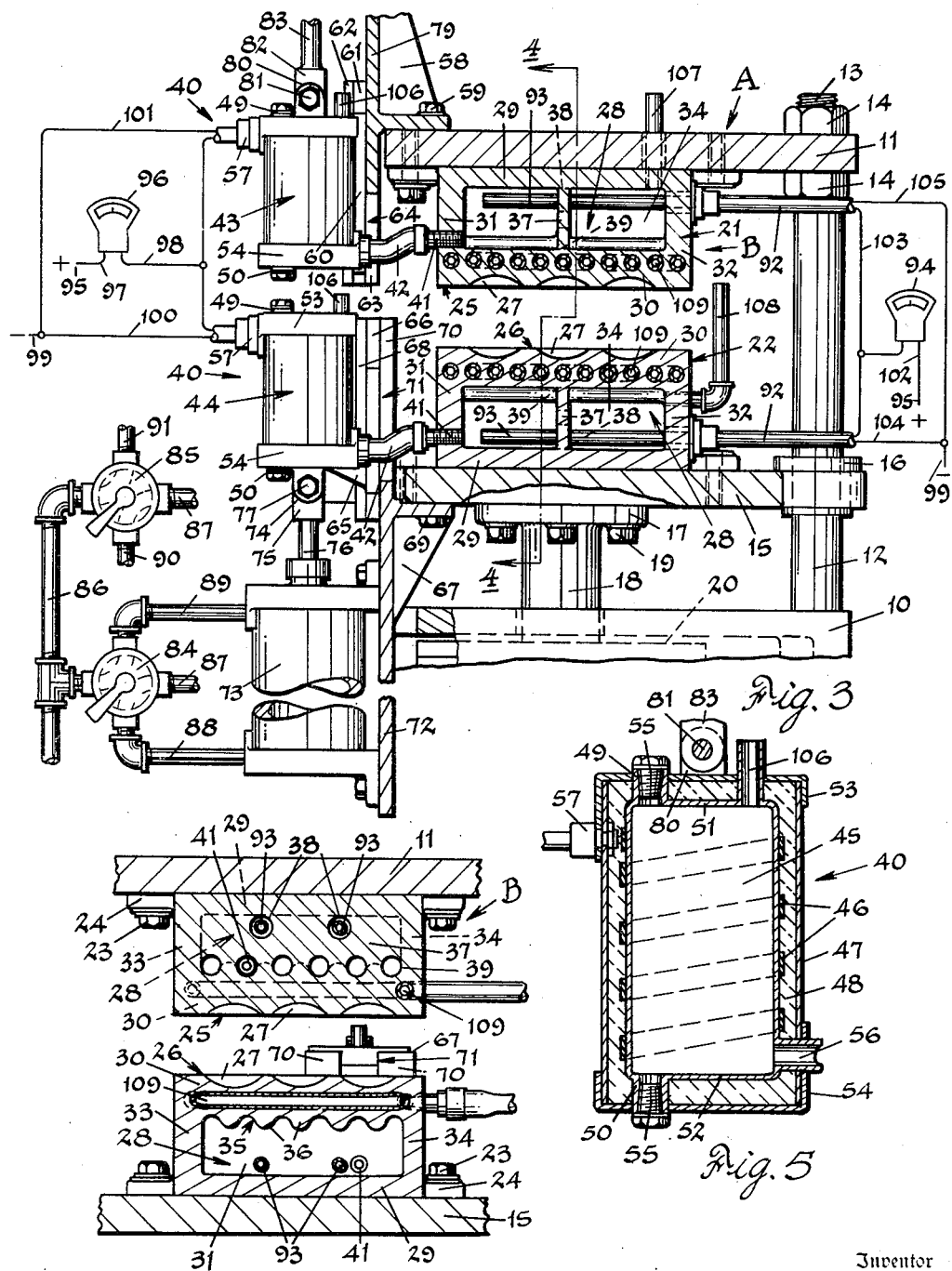

Patented Sept. 12, 1950

2,521,847

UNITED STATES PATENT OFFICE 2,521,847

APPARATUS AND METHOD FOR HEATING MOLDS

Claude F. Harr, Toledo, Ohio

Application August 30, 1949, Serial No. 113,190

18 Claims. (Cl. 18—38)

The present invention relates generally to improvements in pressing molds and more particularly to the heating of molds used in the plastic and rubber industries.

More especially, the invention appertains to a method of and apparatus for heating and controlling the temperature of casting molds, whether of the transfer, injection, or compression type, by the use of a heat transmitting fluid and a self-contained fluid supply unit whereby more efficient operation of the molds is attained.

In a broad sense, this invention is concerned with the rapid, controlled heating of a hollow casting mold, or its sectional parts, by a special heat transmissive fluid, the ambient temperature of which is determined by a heat generating source that is disposed in close proximity to the mold. The required working temperature of the mold may thus be obtained by a predetermined directional movement of the fluid within a closed operating system to effect heating of the mold matrices to temperatures suitable for the formation of articles from plastic compounds, rubber, and like compressible or moldable materials.

The heat transmitting fluid is essentially a solid having a known melting point; and since it is possible to raise or lower the melting point of the fluid by varying the constituent elements of the solid, it is contemplated that solid materials will be utilized having a melting point compatible to the working temperature of the material to be cast. The temperature range of heat thus transmitted to the mold, or maintained therein, may accordingly be predetermined and a definite sequence of operation obtained between the heating fluid and the composition of the material to be cast.

In accordance with the instant invention, the usual piping systems employed in the heating of this type of mold, and the attendant maintenance thereof may be dispensed with to the end that a more efficient, accurate and precise control of the heating means may be obtained and operating costs materially lowered.

Therefore, an important object of the invention is to provide a novel and improved method and apparatus for heating casting molds wherein a heating medium, which is movable directly between the mold as a heat source, is employed.

Another object of the invention is to provide a method and apparatus for heating casting molds wherein mediums of known melting temperatures are employed, with said melting temperatures being compatible with the working temperature of the material to be cast.

Another object of the invention is to provide a heating means containing a permanently usable heat transmitting medium and which is operable to heat said medium and to move the same to and from the separable sections of a casting mold.

A further object of the invention is to provide a heating means comprising a receptacle for the permanently usable heat transmitting medium, in combination with a hollow mold for receiving the heat transmitting medium therein; said receptacle being adapted to direct said medium to or from the mold by gravity flow whereby to effect a relatively rapid increase or decrease of the mold temperature.

A further object of the invention is to provide heating means including individual fluid heating receptacles for each section of a casting mold, and means for actuating said receptacles so that the heat transmitting fluid contained therein may be continuously moved between said receptacles and mold sections thereby reducing heat losses and the attendant costs of supply and maintenance.

A further object of the invention is to provide in a casting mold, a mold section having an attachable heated fluid supply source, and an auxiliary heat maintaining element which includes means for substantially immediately raising or lowering the temperature of the mold section to shorten the production cycle in a highly efficient and effective manner.

A still further object of the invention is to provide a heat control apparatus for a casting mold of novel, simple construction which can be fabricated, installed and operated at a relatively low cost.

Other objects and advantages of the invention will become more apparent during the course of the following description, when taken in connection with the accompanying drawings.

In the drawings, wherein like numerals are employed to designate like parts throughout the same:

Fig. 3 is a vertical, transverse section of the apparatus shown in Fig. 1;

Fig. 4 is a vertical, transverse section through the mold substantially on line 4—4 of Fig. 3;

Fig. 5 is an enlarged detail view of one of the receptacles for the heating fluid.

Figure 1:
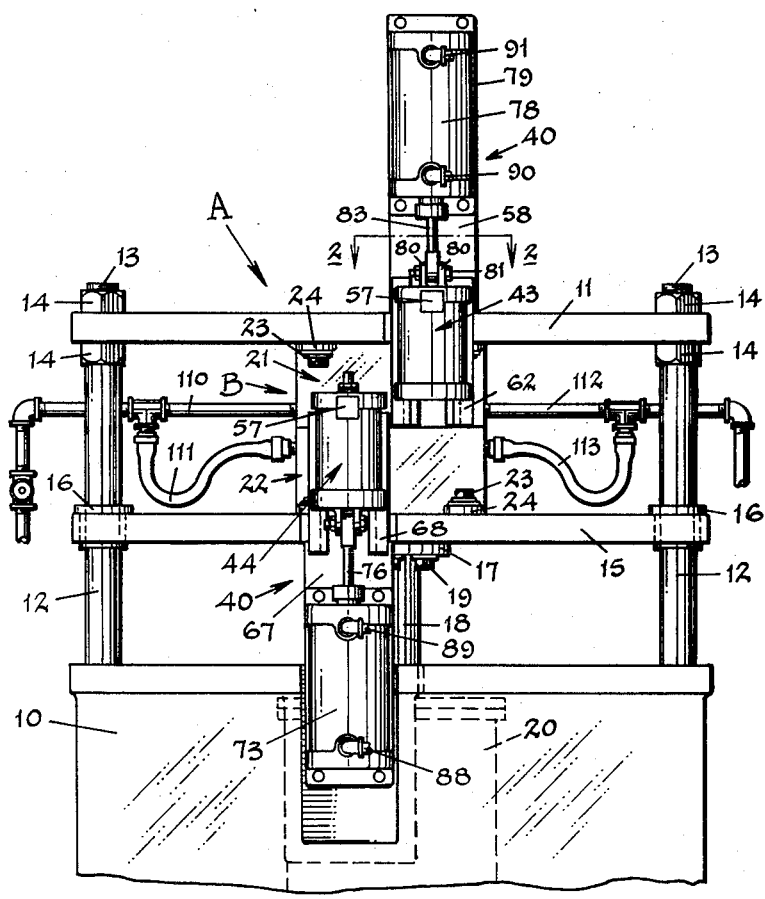
Fig. 1 is a side elevation of a casting mold equipped with heating means constructed in accordance with the invention, the mold being shown in closed position.

Heretofore, compressible and moldable materials, such as plastics and rubber, have been shaped according to mold matrices and caused to conform therewith in finished form by the application of heat and pressure, or alternate cycles of heating and cooling in combination with pressure. Ordinarily, molds of this character are connected to a main source of heat by complicated systems of piping and controls which inherently must be thoroughly insulated and which require continual replenishing and/or maintenance. Even individual or unitary heating systems for the mold matrices have entailed a multiplicity of insulated pipes to convey a suitable medium from a heat source to the molding members. Now, by the use of the invention herein provided and a practical embodiment of which is hereinafter described and illustrated in the drawings, it is possible to employ a heat transmitting medium that is adapted to be continuously re-used, and, while in a molten condition, moved through an exceedingly short distance to and from the mold or the molding members thereof. Production cycles may thus be greatly increased while a related efficiency is indicated in lower over-all costs.

Referring now particularly to the drawings, there is disclosed in Fig. 1, by way of example and as one application of the invention, a platen type press generally designated by the letter A, and having mounted thereon in vertically movable, mating relation the two sections or matrices of a typical compression mold B.

The press A conventionally comprises a bed 10 and a crown plate 11 carried by pillars 12 arranged at the corners of the bed and having upper threaded ends 13 for receiving nuts 14 which secure the crown plate in place. Interposed between the bed 10 and crown 11 and movable therebetween, is a horizontal platen 15 provided at the corners thereof with guide bushings 16 slidably associated with the pillars 12 so that the platen may move upwardly and downwardly thereon. The platen 15 is supported on and secured to the flanged upper end 17 of a vertically disposed piston ram 18 by bolts or the like 19. The lower end of the piston ram is received in an actuating cylinder 20 contained within the bed 10 of the press.

Carried by the crown plate 11 and platen 15 are the mating sections 21 and 22 of the compression mold B. These mold sections, which are substantially duplicates of each other, are secured to their respective supporting member (crown plate 11 and platen 15) by bolts 23 passing through ears 24 formed integral with the mold section. The inner opposed faces 25 and 26 of the mold sections are conventionally provided with shaped matrix areas, indicated at 27, which are finished according to the desired form of article to be cast. While these matrix areas 27 are illustrated, by way of example, as having generally concave surfaces, it is to be understood that the matrices of one mold section may vary from the other to impart different contours in or on the opposed surfaces of the article when cast.

The mold sections 21 and 22 are each provided with an internal chamber or cavity 28 which is defined by a base wall 29, outer wall 30 (the exterior surface of which constitutes the mold face), side walls 31 and 32 and end walls 33 and 34. Preferably, the inner surface 35 of the outer wall 30 is grooved or corrugated to form ridges 36 for increasing the surface area Fig. 4. Also to structurally support the central areas of the outer walls 30, a transversely extending wall 37 is provided between the end walls 33 and 34. The wall 37 also has cored openings, as indicated at 38 and 39, formed therein to permit movement of the heat transmitting medium into all areas of the cavity 28. As shown more particularly in the mold section 21 in Fig. 4, the cored openings 38 are located tangentially with the base wall 29 while the openings 39 are spaced between the ridges 36 of the wall 30.

The internal cavity 28 of each mold section 21 and 22 is in communication through the side wall 31 thereof with a fluid heating means, generally indicated at 40, by means of a pipe 41 threaded into and through said side wall and having attached to its outer end a flexible conduit 42. The conduit 42 is preferably of an insulated, heat impervious material suitable for carrying high temperature fluids between the heating means and the cavities of the mold sections while, as will be more fully hereinafter described, the said heating means is being moved relative to the related mold sections.

It has been found advantageous in the novel heating system of this invention, to employ low melting point solids, such as metallic alloys, as the heat transmitting medium since there will be no appreciable body loss of the solid and it is well adapted to move, while in a molten condition, along a directed course or while in a solidified state to be easily contained for repetitive use.

Since metallic alloys may have differing constituent parts and thereby be responsive to controllable though variable melt temperatures, they are very adaptable to the purpose of this invention. By way of illustration, a lead-bismuth alloy, such as is sold under the trade-name of "Cerrobase" may be employed. This alloy has proportionate parts of 44.5% lead and 55.5% bismuth and will melt at approximately 255 degrees Fahrenheit. Another type of alloy which may be used is that sold under the trade-name of "Cerrobend." This alloy consists of substantially 50% bismuth, 26.7% lead, 13.3% tin and 10% cadmium, and has a melting temperature of approximately 160 degrees Fahrenheit. Specific alloy combinations may thus be obtained that are reducible to a molten condition at a temperature well within the temperature range at which one or more types of material, to be cast, can be safely worked.

The molten alloy constituting the mold heating fluid is normally contained in receptacles or reservoirs 43 and 44 forming a part of the heating means 40; the reservoir 43 being in communication with the mold section 21 while the reservoir 44 communicates with the mold section 22. As best shown in Fig. 5, each of these reservoirs comprises an inner shell 45, that is adapted to be heated by an electric resistance coil 46, and an outer jacket 47 spaced from the inner shell 45 and having interposed therebetween a layer 48 of suitable insulating material. The inner shell 45 is provided with a filler pipe 49 and a drain 50 in its top wall 51 and bottom wall 52 respectively. The pipes 49 and 50 project through the layer of insulation 48 and the end caps 53 and 54 of the outer jacket 47 and are closed by suitable threaded plugs 55.

Each shell 45 is also provided adjacent its lower end with an outlet pipe 56, extending through the insulation 48 and jacket 47 and being connected to the respective flexible conduit 42 which leads to one of the mold cavities 28. The resistance coil 46 which encircles the shell 45 is connected to a source of electrical energy through a junction box 57 secured to the jacket 47 and extending inwardly therethrough as shown in Fig. 5.

The reservoirs 43 and 44 are supported on the press A so as to be individually movable in a vertical direction to cause the molten alloy to flow by gravity from their respective shells 45 to the mold cavities 28 as said reservoirs are raised at the beginning of the casting operation and to flow by gravity from said cavities 28 back into the shells 45 when the reservoirs are lowered upon completion of the casting operation. Advantage may thus be taken of the natural tendency of the fluid to flow toward a lower level and to induce, by reason of its molten temperature, the rapid heating of the mold and inversely to as rapidly dissipate the mold heat by removal of the fluid therefrom. As shown, the reservoir 43 is mounted for vertical sliding movement upon the crown plate 11, while the reservoir 44 is slidably carried by the platen 15.

Figure 2:
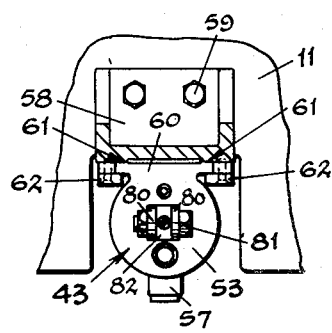
Fig. 2 is a horizontal detail section of the heating means taken on line 2—2 of Fig. 1.

More particularly, the reservoir 43 is supported by a bracket 58 that is secured to the crown plate 11 by bolts 59. The reservoir is slidably mounted with respect to the bracket by means of a base flange 60 (Fig. 2) formed integrally with the upper closure cap 53. The marginal side edges of the base 60 are received in vertical slideways 61 on the bracket 58 and are retained therein by gib plates 62. The slideways 61 are arranged at opposite sides of the bifurcated lower end 63 of the bracket which results in the formation of a slot 64 in which the conduit 42 is freely movable.

As shown in Fig. 1, the reservoir 44 is mounted beneath the reservoir 43 but is laterally offset with respect thereto so as to permit upward movement of the reservoir 44 with reference to the reservoir 43, although other arrangements of the reservoirs may be provided.

The lower closure cap 54 of reservoir 44 is provided with a flanged base 65, the maginal side edges of which are supported in vertical slideways 66 of a bracket 67 carried by the platen 15. The slideways 66, similar to slideways 61, are provided with retaining gib plates 68. The bracket 67 may be secured to the platen 15 by bolts 69 while the upper end 70 thereof rises above the platen to accommodate vertical movement of the reservoir 44 and is bifurcated to provide a slot 71 for receiving the respective flexible conduit 42.

The bracket 67 is also provided with a depending flange 72 upon which is mounted a vertical operating cylinder 73 located axially beneath the reservoir 44 and connected therewith to effect vertical movement thereof. To this end, the bottom cap 54 of the reservoir 44 has depending ears 74 that are spaced to receive the upper end 75 of a piston rod 76 carried by a piston operating within the cylinder 73. The piston rod 76 may be secured to the ears 74 by a bolt 77.

A similar operating cylinder 78 is also provided for the reservoir 43 and is supported on the vertically disposed flange 79 of the bracket 58 above said reservoir. The upper end 53 of the reservoir 43 has formed thereon spaced ears 80 between which is secured, such as by a bolt 81, the lower end 82 of a piston rod 83 extending from a piston operating in cylinder 78.

While in some forms of construction, the operating cylinders 73 and 78 may be connected in parallel to a source of pneumatic or hydraulic pressure through suitable valve means, it is preferred, as herein illustrated, that separate control valves 84 and 85 be utilized so that the lower reservoir 44 may be elevated in advance of the upper reservoir 43 at the start of the casting operation. By means of this arrangement, the molten alloy flowing from reservoir 44 into the cavity 28 of mold section 22, will be caused to contact the upper surface thereof at substantially the same time the molten alloy flowing from reservoir 43 contacts the lower surface of the cavity 28 of mold section 21. Thus, the desired heat transmitted to the matrices 27 of the mold sections will be substantially equalized to effect uniform distribution of the heat throughout the contained material being cast.

The control valves 84 and 85 are connected to supply and drain pipes 86 and 87 respectively and communicate with their respective cylinders 73 and 78 through pipes 88—89 and 90—91. The pipes 88 and 90 are adapted to direct the desired pneumatic or hydraulic pressure to move the reservoirs 43 and 44 upwardly while the pipes 89 and 91 are connected to the upper ends of the cylinders to effect the lowering of the reservoirs upon proper operation of the valves 84 and 85. By providing a common control means for the valves, the upward movement of the reservoirs can be timed to automatically effect a gravity flow of the molten alloy outward from the shells 45, through the flexible conduits 42 to the respective internal cavities 28 of the mold sections 21 and 22. Upon completion of the casting operation and reversal of the valves 84 and 85, the reservoirs 43 and 44 are lowered by their respective cylinders 73 and 78 to induce a reverse gravity flow to return the molten alloy to their shells 45. Since the heat for heating the mold sections is supplied by the molten alloy, its movement from the mold cavities 28 at the completion of the casting operation actually tends to "drain off" the mold heat thereby allowing the mold sections to cool rapidly by radiation. In other words, the molten alloy carries the heat away with it, thereby reducing the mold cooling time and making for increased production. While pneumatic or hydraulic means has been herein disclosed for effecting the vertical movements of the reservoirs 43 and 44, suitable mechanically operated means may be provided for this purpose.

Provision is also made for maintaining the molten alloy at a desired temperature within the cavities 28 of the mold sections and, further, to boost the temperature when found necessary each mold section carries immersion type heaters 92. These heaters are mounted by conventional insulating methods in the side walls, such as the side walls 32, of the mold sections. The tubular heating elements 93 of the heaters are located in the mold cavities 28 and extend the cored openings 38 in the wall 37. When the cavities 28 are filled with the molten alloy, the heating elements 93 are sufficiently submerged therein to control the temperature of the molten alloy while the heat is being transmitted through the outer walls 30 of the cavities to the contained casting material. As previously described, the inner surfaces 35 of the cavity walls 30 are provided with ridges 36 to increase the surface areas of the same and afford a greater and more rapid heat transmission surface.

The immersion heaters 92 may be individually controlled, or, as shown diagrammatically in Fig. 3, may be connected in parallel to a source of electrical energy through a thermostatic switch 94.

In operation, the resistance coils 46 of the reservoirs 43 and 44 are connected to a source of electrical energy 95 through a thermostatic switch 96 by lines 97 and 98, the circuit being completed to the negative side 99 by lines 100 and 101. The alloy material is then introduced into the inner shells 45 through the filler pipes 49 and maintained therein at its melting temperature by the setting of the thermostatic switch 96. During "down" periods between casting operations, the switch 96 can be adjusted to allow cooling of the alloy into a solidified condition.

Subsequently, and when the alloy material within the reservoir shells 45 has again been reduced to a molten condition by the heat output through the coils 46 and as determined by the adjusted setting of the switch 96, the material to be formed or shaped by the mold B is placed in any conventional manner in the shaped matrices 27 of the mold sections 21 and 22. At this time, the mold sections are spaced from one another and the other parts of the apparatus disposed in the relative positions illustrated in Fig. 3. Pressure is then directed into the cylinder 20 to raise the piston ram 18, the platen 15 and consequently the mold section 22 toward the mold section 21.

When the mold sections 21 and 22 are moved into contacting engagement with one another, the control valves 84 and 85 are turned to connect the pipes 88 and 90, leading to cylinders 73 and 78 with the pressure line 86 and thereby cause the piston rods 76 and 83 to move the reservoirs 43 and 44 upwardly until the molten alloy within the related shells 45 flows by gravity through the conduits 42 to the internal cavities 28 of the mold sections. To maintain the temperature of the alloy so that the heat thereof will be rapidly transmitted and without any dissipating effect through the walls 30 to the casting material, the immersion heaters 92 are connected to the electric source 95 through thermostatic switch 94 by lines 102 and 103; the circuit being completed to the negative side 99 by lines 104 and 105.

The switch 94 may be adjusted to the melting temperature of the molten alloy in the mold cavities 28 to hold a temperature range as previously determined and as controlled by the thermostatic switch 96; or switch 94 may be set to raise the working temperature when found desirable. During a continuous production operation, the switches 94 and 96 may be adjusted and not altered in their setting since the desired molten condition of the alloy is maintained both in the shells 45 and mold cavities 28.

Upon completion of the casting cycle, the platen 15 is lowered to open the mold sections 21 and 22 and the control valves 84 and 85 may be reversed either in advance of the opening of the mold sections or concurrently therewith. The pipe 86 will then be connected to the pipes 89 and 91 and the exhaust pipe 87 to the pipes 88 and 90. The cylinders 73 and 78 will then cause the reservoirs 43 and 44 to move downwardly until the outlet pipes 56 of the shells 45 are lower than the pipes 41 in the mold sections whereupon the molten alloy will drain by gravity from the mold cavities 28 back into the shells 45 thereby rapidly dissipating the heat of the mold sections and allowing them to cool quickly by radiation. During a repeating operating cycle, the platen 15 is raised to again close the mold sections 21 and 22 and the valves 84 and 85 reversed to lift the reservoirs 43 and 44 until the molten alloy again flows from the shells 45 through the flexible conduits 42 to the mold cavities 28.

In order to prevent undesirable pressure from being built up within either the shells 45 of mold cavities 28, exhaust pipes 106 are provided, as shown in Fig. 5, in the top walls 51 of the shells 45 to communicate with the atmosphere through the closure caps 53. The mold section 21 is provided with a pipe 107 to allow for the exhaust of free air as when the molten alloy fills the cavity 28 and to subsequently admit fresh air to reduce any vacuous condition as well as to cool the interior of the mold section. The lower mold section 22 is similarly provided with an exhausting orifice although, in this instance, said air exhaust is made possible by a stack 108, the upper end of which is located above the level of the alloy in either the reservoir 44 or the cavity 28 of mold section 22 to prevent overflow when the alloy enters said cavity.

In the event the mold B is of the type employed in casting operations which involve combined and alternate heating and cooling cycles within the working cycle, the mold sections 21 and 22 are each provided with a sinuous passageway 109 which may be formed by preshaping soft metal tubing and casting the same integrally into the body of the mold sections and particularly in the outer wall 30 between the cavity 28 and the exterior face of the section. When alternate heating and cooling of the mold sections and casting materials being processed therein is required within the work cycle, the valves 84 and 85 are operated while the mold sections are still closed to lower the reservoirs 43 and 44, and thereby drain off the molten alloy and its heat while a cooling fluid is introduced by the supply pipes 110 and 111 (Fig. 1) into one end of the passageways 109 to rapidly chill the finished molded article. The passageways 109 may be connected to a suitable drain at their opposite ends by the pipes 112 and 113.

Figure 6:
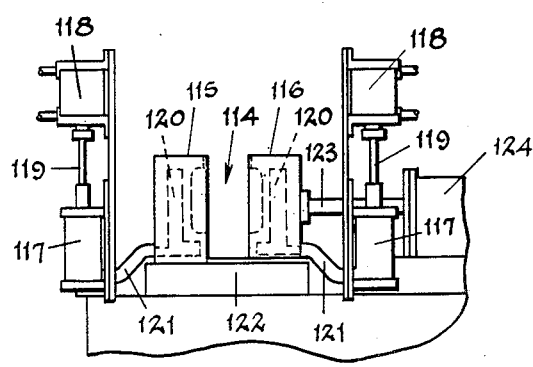
Fig. 6 is a diagrammatic view of a modified form of apparatus.

As an example of the adaptability of the novel and improved mold heating means of this invention to other forms of casting apparatus, there is shown in Fig. 6 a vertical type of mold, generally designated 114, having horizontally movable, separable sections or molding members 115 and 116. In this particular construction, the mold sections are provided with heating means including reservoirs 117 containing the molten heat transmitting medium, with the reservoirs being elevated or lowered by means of their associated cylinders 118 and operative connections 119. The chambers or cavities 120 of the mold sections are located in a common horizontal plane and connected with the reservoirs 117 by flexible conduits 121. Thus, the cylinders 118 can be simultaneously actuated to raise and lower the reservoirs 117 to cause the heat transmitting medium to flow by gravity to and from the mold cavities. The mold section 115 is mounted in a fixed position on the base 122 while mold section 116 is movable thereon toward and away from mold section 115 by a piston ram 123 operating within a cylinder 124.

It is to be understood that the form of the invention herewith shown and described is to be taken as the preferred embodiment of the same,

I claim:

1. An apparatus for heating a mold having a chamber therein, a reservoir mounted in proximity to the mold and communicating with said chamber, a heat transmitting fluid contained in said reservoir, and means for moving the reservoir and mold vertically relative to one another to cause the heat transmitting fluid to flow by gravity from said reservoir into said chamber.

2. An apparatus for heating a mold having a chamber therein, a reservoir mounted in proximity to the mold and communicating with said chamber, a heat transmitting fluid contained in said reservoir, and means for moving the reservoir vertically relative to the mold in one direction to cause the heat transmitting fluid to flow by gravity into said chamber and in the opposite direction to cause the fluid to flow back into said reservoir.

3. An apparatus for heating a mold having a chamber therein, a reservoir mounted in proximity to the mold, flexible connections between the reservoir and chamber placing them in communication with one another, a heat transmitting fluid contained in said reservoir, and means for moving the reservoir and mold vertically relative to one another to cause the heat transmitting fluid to flow alternately from one to the other.

4. An apparatus for heating a pair of mold sections having fluid chambers therein, a reservoir communicating with the chamber of each mold section, a molten heat transmitting medium contained in each reservoir, and means for moving the mold sections and reservoirs vertically relative to one another to cause the molten heat transmitting medium to flow by gravity from the reservoirs into the fluid chambers of the mold sections.

5. An apparatus for heating a pair of mold sections having fluid chambers therein, two reservoirs mounted in proximity to the mold sections, flexible connections between the reservoirs and fluid chambers placing them in communication with one another, and means for moving the reservoirs vertically relative to the mold sections in one direction to cause the molten heat transmitting medium to flow by gravity into said chambers and in the opposite direction to cause the molten medium to flow back into said reservoirs.

6. An apparatus for heating a pair of mold sections having fluid chambers therein, a reservoir communicating with the chamber of each mold section, a molten heat transmitting medium contained in each reservoir, means for heating said reservoirs, means for moving the reservoirs vertically to cause the heat transmitting medium to flow by gravity into the fluid chambers, and means for controlling the temperature of the said medium in the said chambers to maintain the temperature of the mold sections within a predetermined range.

7. An apparatus for heating a pair of mold sections having fluid chambers therein, a reservoir mounted in proximity to each mold section, flexible connections between the reservoirs and chambers placing them in communication with one another, a molten heat transmitting medium contained in each reservoir, means for heating said reservoirs, means for moving the reservoirs vertically relative to the mold sections to direct the heat transmitting medium into the fluid chambers, and means contained in said chambers for varying the temperature of the said medium to control the temperature of the mold sections.

8. An apparatus for heating a pair of mold sections having fluid chambers therein, a reservoir flexibly connected to and communicating with the chamber of each mold section, a metal alloy contained in each reservoir, means for heating the reservoirs to reduce the alloy to a fluid condition, and means for moving the reservoirs and mold sections vertically relative to one another to cause the molten alloy to flow from the reservoirs into the fluid chambers and thereby effect the heating of the mold sections.

9. An apparatus for heating a pair of mold sections having fluid chambers therein, a reservoir connected to each mold section and communicating with the chamber therein, a cylinder associated with each reservoir for producing vertical movements thereof, a metal alloy contained in each reservoir, heating means for reducing the alloy to a fluid condition, and means for actuating the cylinders to move the reservoirs and thereby cause the molten alloy to flow to and from the chambers of the mold sections at the start and completion of the molding operation.

10. An apparatus for heating a pair of mold sections having fluid chambers therein, a reservoir connected to each mold section and communicating with the chamber therein, a cylinder operatively connected to each reservoir for producing vertical movements thereof, a metal alloy contained in each reservoir, heating means for reducing the alloy to a fluid condition, a pressure control system for actuating the cylinders to move the reservoirs vertically whereby to cause the molten alloy to flow by gravity to and from the chambers of the mold sections during the molding operation, and means for controlling the temperature of the molten alloy within the fluid chambers to maintain the temperature of the mold sections within a predetermined range.

11. An apparatus for heating a pair of mold sections having fluid chambers therein, a pair of reservoirs containing a molten heat transmitting medium, a flexible connection between each reservoir and a fluid chamber placing them in communication with one another, a cylinder operatively connected to each reservoir for producing vertical movements thereof, heating means for each reservoir, a pressure control system for actuating each cylinder to effect independent movement of the reservoirs to direct the heat transmitting medium therein to and from the chambers of the mold sections, and means for alternately cooling the mold sections during a molding operation.

12. In an apparatus for heating a pair of mold sections having fluid chambers therein, a pair of reservoirs containing a molten heat transmitting medium, a flexible connection between each reservoir and a fluid chamber placing them in communication with one another, a cylinder operatively connected to each reservoir for producing vertical movements thereof, heating means for each reservoir, a pressure control system for actuating each cylinder to direct the molten heat transmitting medium by gravity to the fluid chambers when the reservoirs are raised and by gravity from the fluid chambers back into the reservoirs when the same are lowered, means for heating the heat transmitting medium while contained in the fluid chambers, and means for cooling the mold sections when the heat transmitting medium has been drained from the chambers therein.

13. The method of heating a mold having a chamber therein, comprising providing a source of heating liquid in proximity to the mold, and causing the liquid to flow by gravity from said source into the chamber at the beginning of the molding operation and to subsequently flow therefrom by gravity back to said source at the completion of the molding operation.

14. The method of heating a mold having a chamber therein, comprising providing a source of heating liquid in proximity to the mold, causing the liquid to flow by gravity from said source into the chamber at the beginning of the molding operation and to subsequently flow therefrom by gravity back to said source at the completion of the molding operation, and in maintaining the temperature of the liquid while in the chamber within a predetermined range.

15. The method of heating a mold having a chamber therein, comprising establishing a confined source of heated liquid, and causing said liquid to flow by gravity from said source into the chamber at the beginning of the molding operation and subsequently back to the confined source at the completion of the molding operation upon relative movement between said source and mold.

16. The method of heating a hollow mold, comprising establishing a confined source of a molten alloy, heating said source of molten alloy, causing the molten alloy to flow by gravity from said source to said mold to effect the heating thereof, and subsequently causing the molten alloy to flow from said mold by gravity back to said source.

17. The method of heating a hollow mold, comprising establishing a confined source of a molten alloy, heating said source of molten alloy, causing the molten alloy to flow by gravity from said source to said mold to effect the heating thereof, subsequently causing the molten alloy to flow from said mold by gravity back to said source, and in maintaining the temperature of the molten alloy in the said mold within a predetermined range.

18. The method of heating a hollow mold, comprising establishing a confined source of a heating liquid in communication with the mold, and in effecting relative movement between the source of heating liquid and mold to cause the heating liquid to flow by gravity from the confined source to the mold and subsequently from the mold back to the confined source.

CLAUDE F. HARR.

REFERENCES CITED

The following references are of record in the file of this patent:

UNITED STATES PATENTS

| Number | Name | Date |
|---|---|---|
| 445,426 | Dorman | Jan. 27, 1891 |
| 718,286 | Smith | Jan. 13, 1903 |
| 1,119,560 | Worthington | Dec. 1, 1914 |
| 2,202,964 | Rathbun | June 4, 1940 |